(12) United States Patent
Lu et al.

(10) Patent No.: US 8,670,164 B2
(45) Date of Patent: Mar. 11, 2014

(54) SCANNER

(75) Inventors: Po-Ching Lu, Pingtung County (TW);
Hui-Wen Wen, Hsinchu County (TW);
Ming-Zhou Wang, Henan (CN)

(73) Assignee: Mustek Systems Inc. (TW)

( * ) Notice: Subject to any disclaimer, the term of this patent is extended or adjusted under 35 U.S.C. 154(b) by 235 days.

(21) Appl. No.: 13/042,616

(22) Filed: Mar. 8, 2011

(65) Prior Publication Data

US 2012/0026560 A1   Feb. 2, 2012

(30) Foreign Application Priority Data

Jul. 28, 2010   (CN) .................... 2010 2 0280594 U (51) Int. Cl.
*H04N 1/04*   (2006.01)

(52) U.S. Cl.
USPC ............ 358/488; 358/506; 358/497; 358/498

(58) Field of Classification Search
USPC ................................. 358/488, 506, 497, 498
See application file for complete search history.

(56) References Cited

U.S. PATENT DOCUMENTS

| 5,384,621 | A  | * | 1/1995 | Hatch et al. ..................... 399/42 |
| 5,930,411 | A  |   | 7/1999 | Kojima et al. |
| 2003/0016404 | A1 |   | 1/2003 | Tecu et al. |
| 2003/0133162 | A1 |   | 7/2003 | Lupien, Jr. et al. |
| 2004/0184109 | A1 | * | 9/2004 | Short et al. .................... 358/400 |

FOREIGN PATENT DOCUMENTS

| JP | 02-153672 | 6/1990 |
| WO | 99-05635 | 2/1999 |

OTHER PUBLICATIONS

European Search Report issued on Oct. 31, 2011 in counterpart European Patent Application No. 11173256.6.

* cited by examiner

*Primary Examiner* — Houshang Safaipour
(74) *Attorney, Agent, or Firm* — Volpe and Koenig, P.C.

(57) ABSTRACT

The present invention relates to a scanner with a real-time image auto-cutting function. The scanner includes a positioning element, a scanning scope determining unit and a scanning unit. The scanning scope determining unit is configured on the positioning element, has a specific pattern and is provided to determine a scanning scope. The scanning unit scans the specific pattern to determine the scanning scope.

7 Claims, 10 Drawing Sheets

Cross-Section B-B'

Cross-Section C-C'

Cross-Section D-D'
620

SCANNER

The application claims the benefit of PRC Patent Application No. 201020280594.3, filed on Jul. 28, 2010, in the State Intellectual Property Office of the People's Republic of China, the disclosures of which are incorporated herein in their entirety by reference.

FIELD OF THE INVENTION

The present invention relates to a scanner. More particularly, it relates to a scanner with a scanning scope determining unit.

BACKGROUND OF THE INVENTION

Figure 1A:
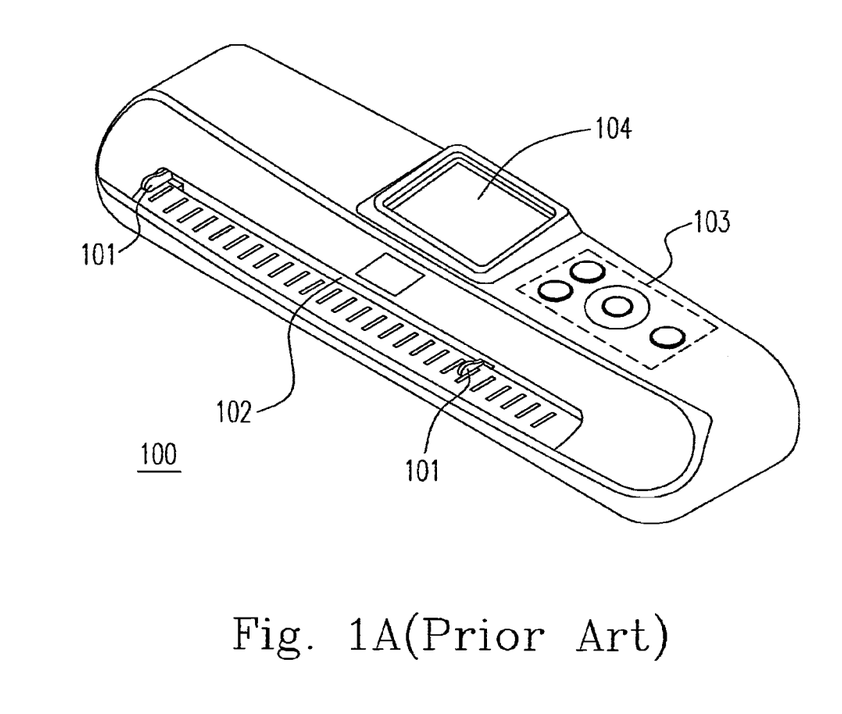
FIGS. 1A and 1B are diagrams showing a conventional scanner.
Figure 1B:
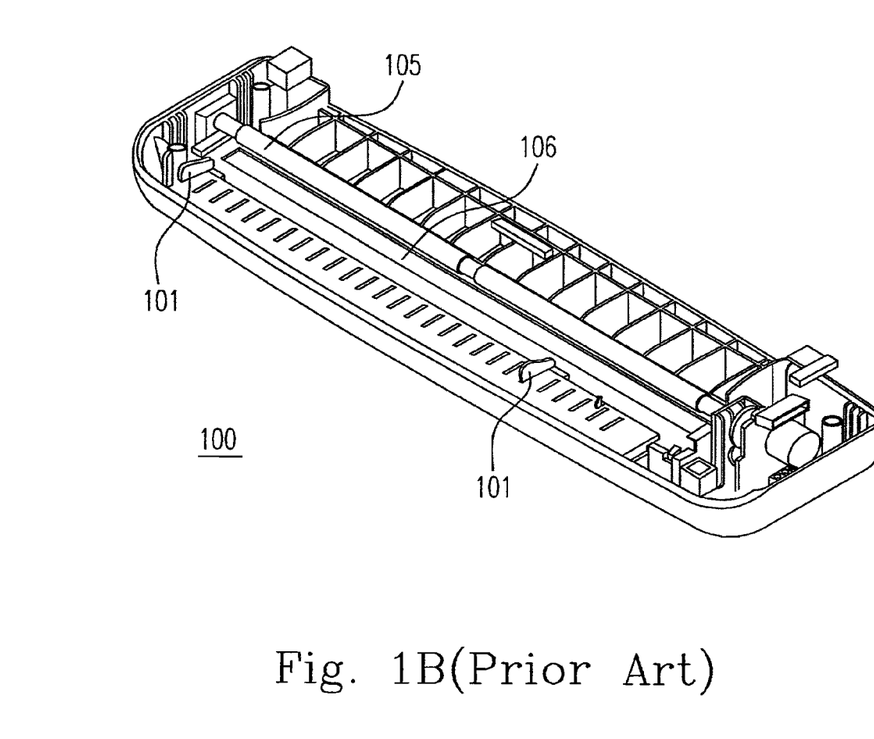

Please refer to FIGS. 1A and 1B which show a conventional scanner. The conventional scanner 100 includes a paper positioning bar 101, an import slot 102, a control panel 103, a display device 104, a roller 105 and a scanning unit 106. When a user scans a picture to obtain an electric file via the conventional scanner 100, the paper enters the conventional scanner 100 from the import slot 102 via the roller 105 and then the scanning unit 106 scans the paper to obtain the electric file. The scanning unit 106 could be a Charge-Coupled Device (CCD) or a Contact Image Sensor (CIS), and the paper positioning bar 101 is used to prevent the paper from entering the conventional scanner 100 sideways. Namely, the paper positioning bar 101 keeps the entering track straight.

Figure 2:
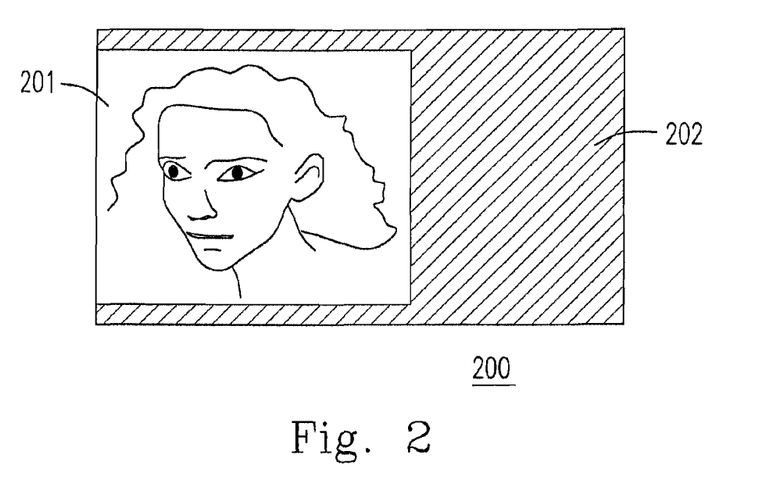
FIG. 2 is a diagram showing an image file generated by a conventional scanner.

Please refer to FIG. 2 which shows an image file generated by a conventional scanner. The image file 200 is obtained via a scanning process and includes a picture pattern 201 and a background pattern 202. In order to simply obtain the picture pattern 201, the background pattern 202 must be removed from the image file 200. If a user wants to remove the background pattern 202 by auto-cutting, a software algorithm is always used to recognize and process the background pattern 202. However, in an embedded operating system, the above method not only requires a long processing time due to the low operation speed of the CPU, but also requires a sufficient memory to store the image before cut and the image after cut.

Figure 3:
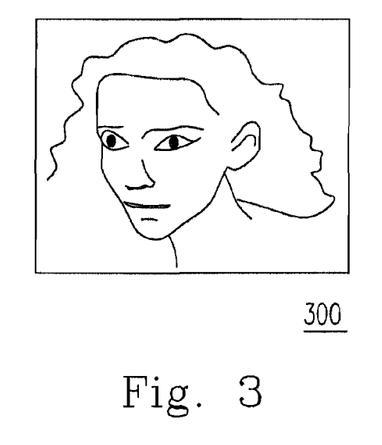
FIG. 3 is a diagram showing a processed image file.

Please refer to FIG. 3 which shows a processed image file. The processed image file 300 is the picture pattern 201 in FIG. 2. The background auto-cutting function is always performed via a software algorithm and the steps of processing are described as follows. The first step is to preset the default background. Then, the second step is to determine an image to be retained. Finally, the third step is to store the retained image. Based on the above reasons, a conventional scanner with the function has the following drawbacks:

(1) A complicated algorithm must be performed to determine the scanning scope or the boundary of the paper.

(2) A big memory must be configured to store the unprocessed image file, which causes the cost increased.

(3) If the object's color level or grey level is too dark, it will be easy for the conventional algorithm to make a mistake so that the image cutting cannot be performed precisely.

Therefore, it would be useful to invent a scanner to circumvent all the above issues. In order to fulfill this need the inventors have proposed an invention "SCANNER." The summary of the present invention is described as follows.

SUMMARY OF THE INVENTION

The present invention is to utilize a scanning unit (or a sensor) and a scanning scope determining unit having a specific pattern so as to determine a scanning scope and to implement a real-time image auto-cutting function. Therefore, the present invention does not demand a complicated conventional algorithm. In addition, the present invention also can speed up the process for obtaining the desired image files or data, scan the object with a desired scanning scope precisely, and reduce the production cost.

According to the first aspect of the present invention, a scanner includes: a processor; a scanning scope determining module having a scanning scope determining unit, coupled to the processor and determining a scanning scope; a scanning unit coupled to the processor and scanning an object to obtain an image file; and a storing unit coupled to the processor and storing the image file.

According to the second aspect of the present invention, a scanner includes: a positioning element; a scanning scope determining unit configured on the positioning element, having a specific pattern and provided to determine a scanning scope; and a scanning unit ascertaining the specific pattern to determine the scanning scope.

According to the third aspect of the present invention, a scanner includes a scanning scope determining unit having a specific pattern and determining a scanning scope.

The foregoing and other features and advantages of the present invention will be more clearly understood through the following descriptions with reference to the drawings:

DETAILED DESCRIPTION OF THE PREFERRED EMBODIMENT

The present invention will now be described more specifically with reference to the following embodiments. It is to be noted that the following descriptions of preferred embodiments of this invention are presented herein for the aspect of illustration and description only; it is not intended to be exhaustive or to be limited to the precise from disclosed.

Figure 4A:
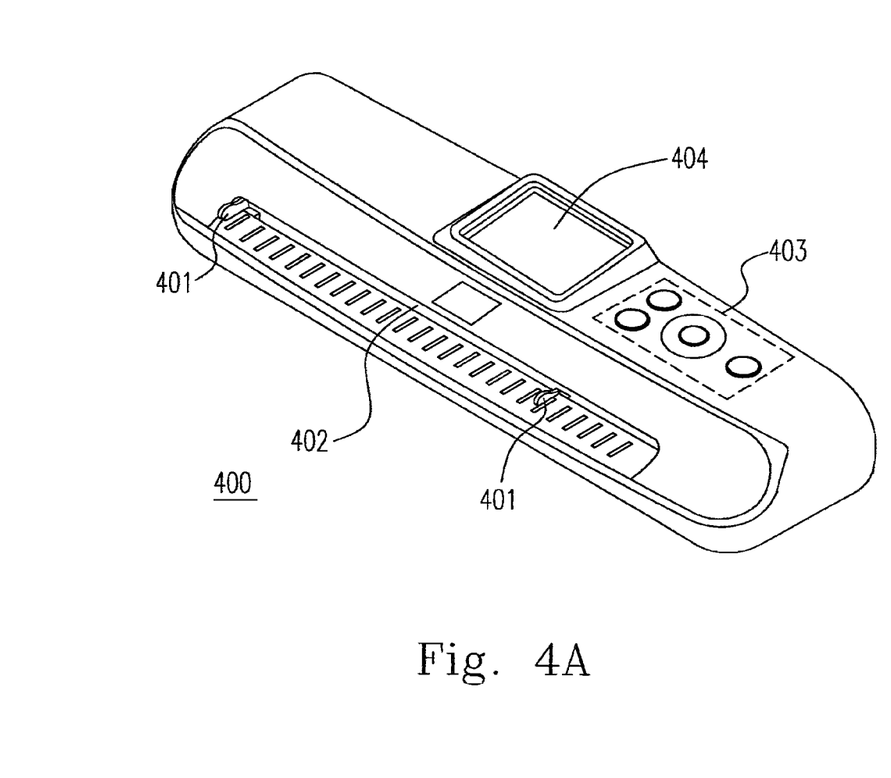
FIGS. 4A and 4B are diagrams showing the first embodiment of the present invention.
Figure 4B:
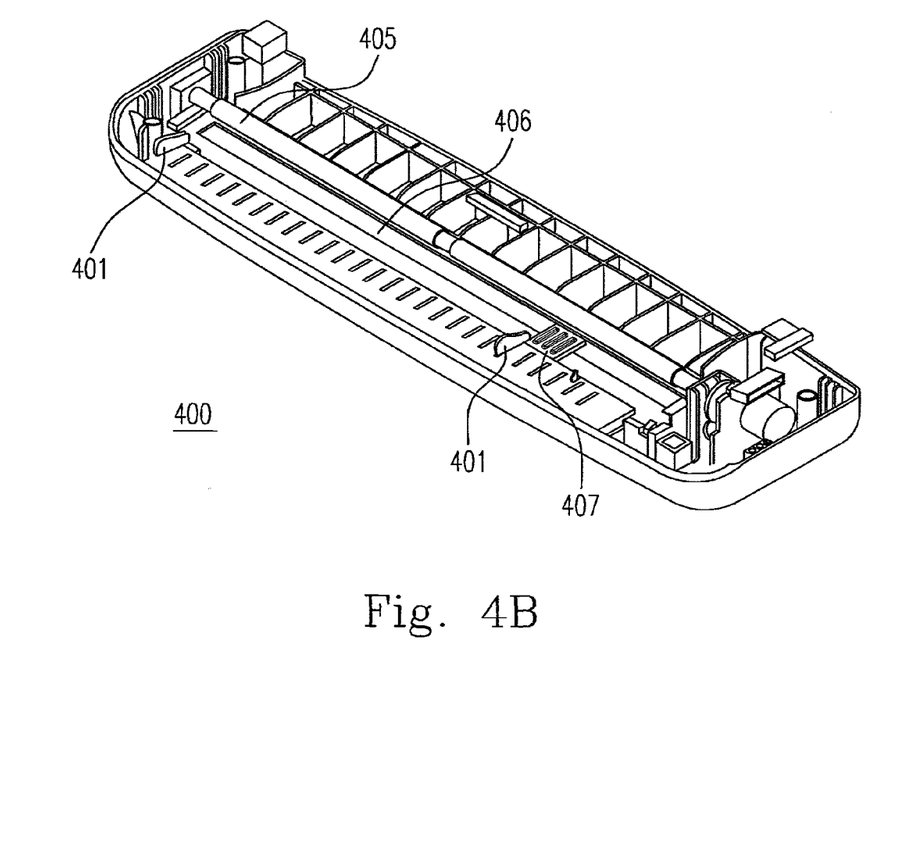

Please refer to FIGS. 4A and 4B which show the first embodiment of the present invention. The first embodiment is a scanner 400. The scanner 400 includes a positioning element 401, an import slot 402, a control panel 403, a display device 404, a roller 405, a scanning unit 406 and a scanning scope determining unit 407. The scanning scope determining unit 407 is configured on the positioning element 401 and has a specific pattern. Besides, the scanning scope determining unit 407 can be configured above the scanning unit 406. When the user scans an object, such as a picture, to obtain an electric file via the scanner 400, the positioning element 401 can be adjusted to prevent the object from entering the scanner 400 sideways. Namely, the positioning element 401 keeps the entering track straight (or in a correct direction). Because the scanning scope determining unit 407 is configured on the positioning element 401 and above the scanning unit 406, the scanning scope determining unit 407 would move with the positioning element 401, so that the scanning unit 406 can read or ascertain the specific pattern of the scanning scope determining unit 407 so as to identify the adjusted position of the positioning element 401 or the scanning scope determining unit 407 when the scanning unit 406 scans the object for obtaining the image. Therefore, when the scanning unit 406 scans every line of the data, it can determine whether the data should be discarded or not at the same time (simultaneously) according to the scanning scope determining unit 407 and store a desired image data (which are not discarded) so as to implement a real-time image auto-cutting function. In other words, the above-mentioned steps correspond to determining or defining the scanning scope of the scanner 400. It is noted that the real-time image auto-cutting function processes the image data and meanwhile, the scanning unit 406 scans the object. Namely, the width of the object can be known once the scanning unit 406 scans or senses the scanning scope determining unit 407, and the image data from the scanning process can be kept or removed in the meanwhile, so that there would not be a lot of data to be operated and a large memory is not necessary any more for storing the image data. In addition, because the scanning scope or the width of the object is known, no matter what contents the object has there will not be any mistake for determining the scanning scope. For example, when the color level or grey level of the boundary of the object is darker, the conventional algorithm would make a mistake and cut the darker image which is desired by the user. Compared with the image file 200 generated by a conventional scanner, the present invention can obtain an image file without the background pattern 202 and can quickly obtain the desired image data, such as the picture pattern 201, without performing a complicated algorithm.

Furthermore, the scanning unit 406 has a scanning region, and the scanning unit 406 could be a Charge-coupled Device (CCD) or a Contact Image Sensor (CIS). The scanning scope determining unit 407 is further configured in the scanning region, and the specific pattern in collaboration with the pattern identifying function can auto-determine the scanning scope or the width of the object. Namely, the scanning scope determining unit 407 can operate once configured in the scanning region, and the scanning scope determining unit 407 could be disposed under or above the scanning unit 406 according to the various designs. It is noted that the scanner 400 could be a sheet-fed scanner, a handy scanner or other conventional scanner with a scanning scope determining unit as described in the present invention, the positioning element 401 could be a paper guide, a paper positioning bar or other element with the same function, and the positioning element 401 and the scanning scope determining unit 407 could be a one-piece formed element.

Figure 5:
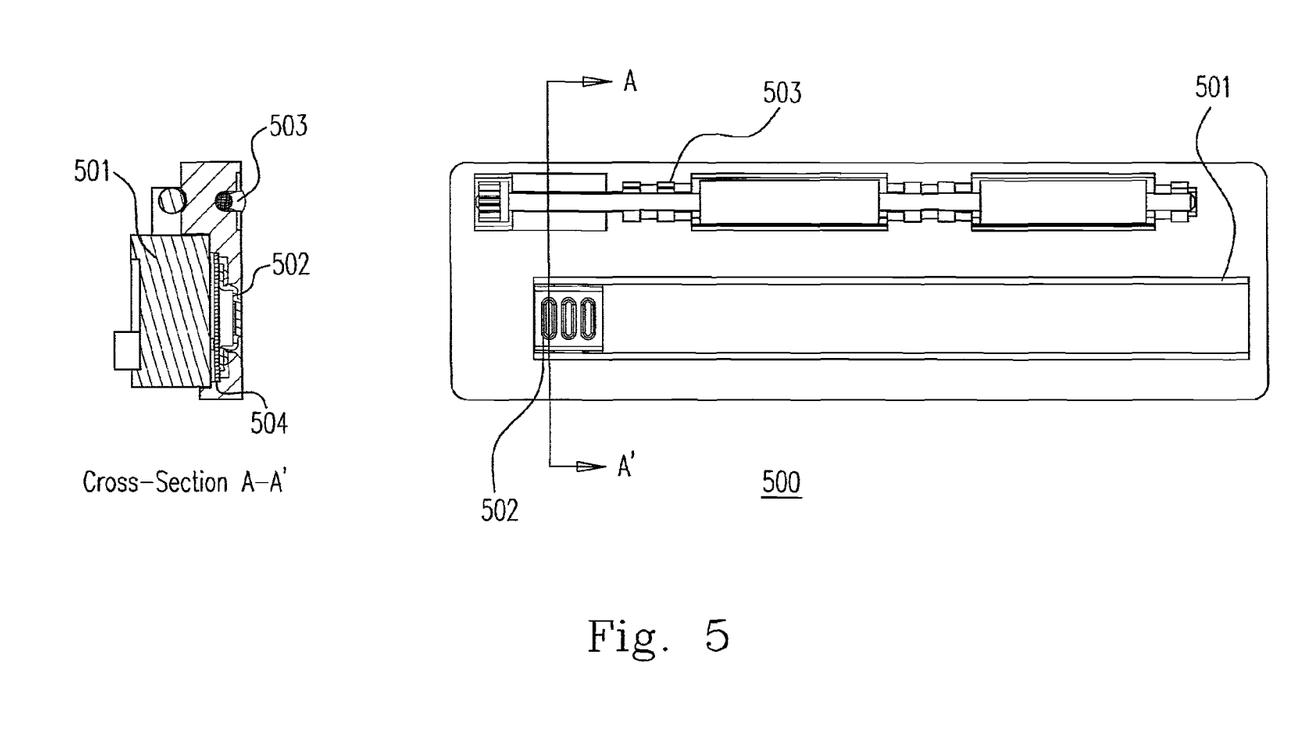
FIG. 5 is a diagram showing the second embodiment of the present invention.

Please refer to FIG. 5 which shows the second embodiment of the present invention. The second embodiment is a scanner 500. The scanner 500 includes a scanning unit 501, a scanning scope determining unit 502, a roller 503 and a protective layer 504. The scanning scope determining unit 502 has a specific pattern and could be movably configured above or under the scanning unit 501. The material of the protective layer 504 can be a glass or any transparent material.

Figure 6A:
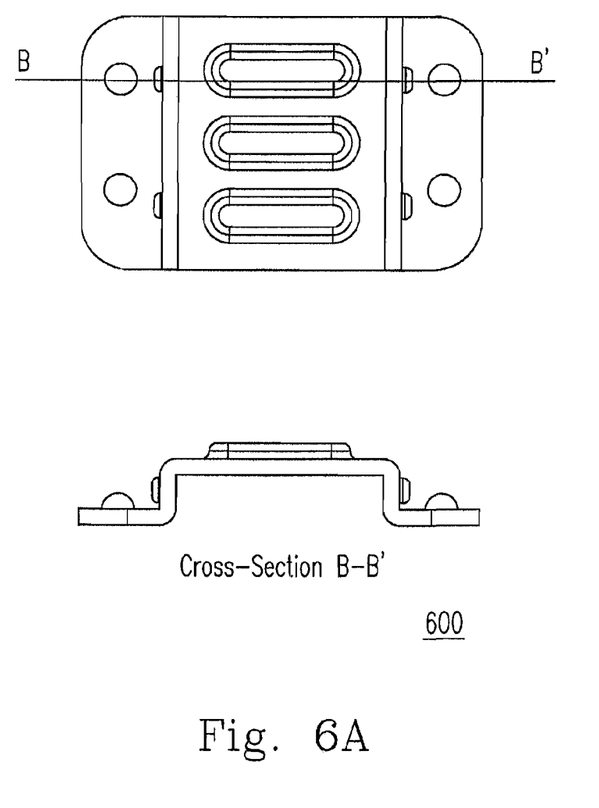
FIGS. 6A~6C are diagrams showing the various scanning scope determining units of the present invention.
Figure 6B:
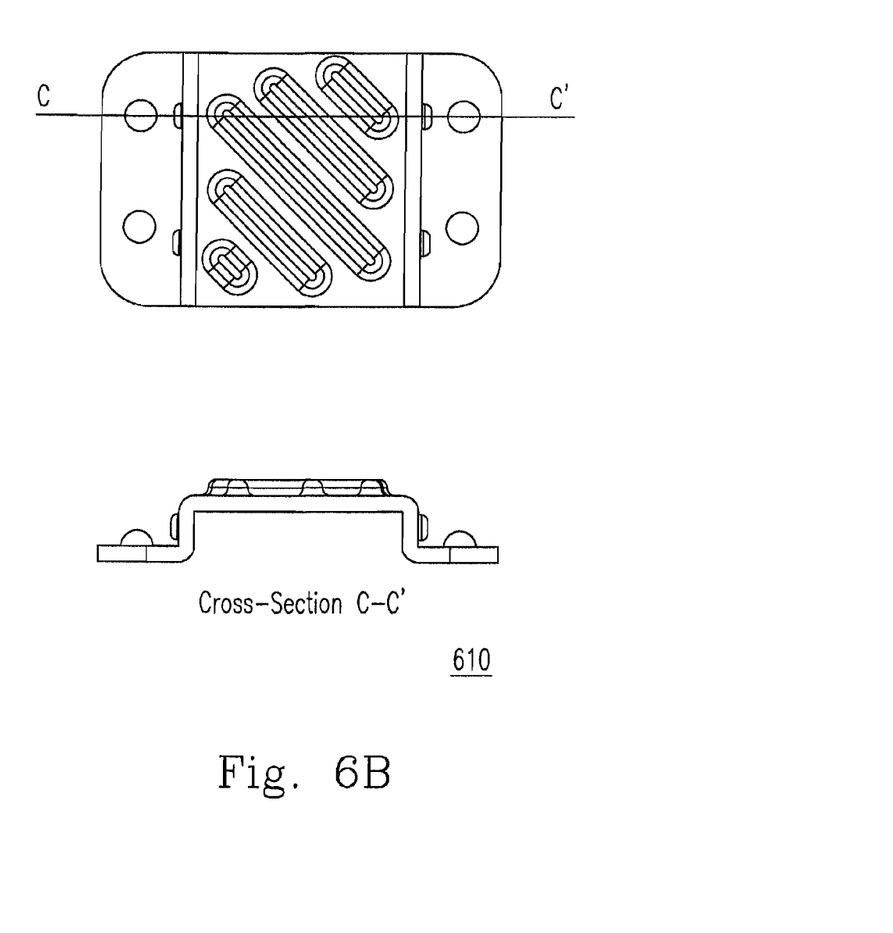
Figure 6C:
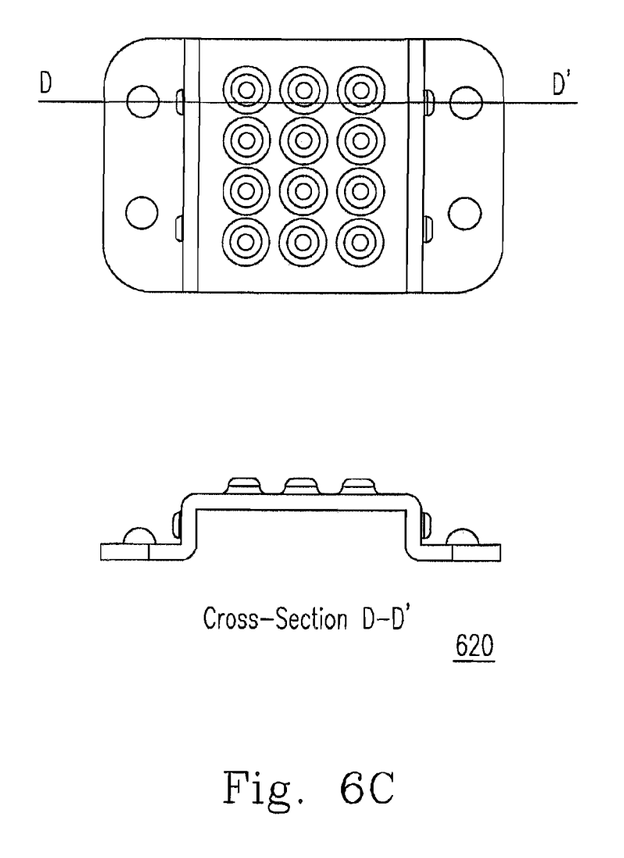

Please refer to FIGS. 6A, 6B and 6C which show the various scanning scope determining units of the present invention. The scanning scope determining units 600, 610 and 620 could have various types of patterns, such as the patterns as shown in FIGS. 6A, 6B and 6C. The specific pattern could be formed by a protrusion or by drawing at least one line on a plane. By using these specific patterns, a scanning unit can identifies the position or other information of the scanning scope determining unit. The specific pattern could be a line, a circle, a non-circle, a polygon, a non-polygon, any other shape or a combination thereof. It is noted that the specific pattern could be a barcode. In addition, the specific pattern can comprise an object, a text, a mark or a figure. The object can have a 2-D or a 3-D shape, and the 3-D shape can have a cross-section being a line, a circle, a triangle, a polygon or a random one.

Figure 7:
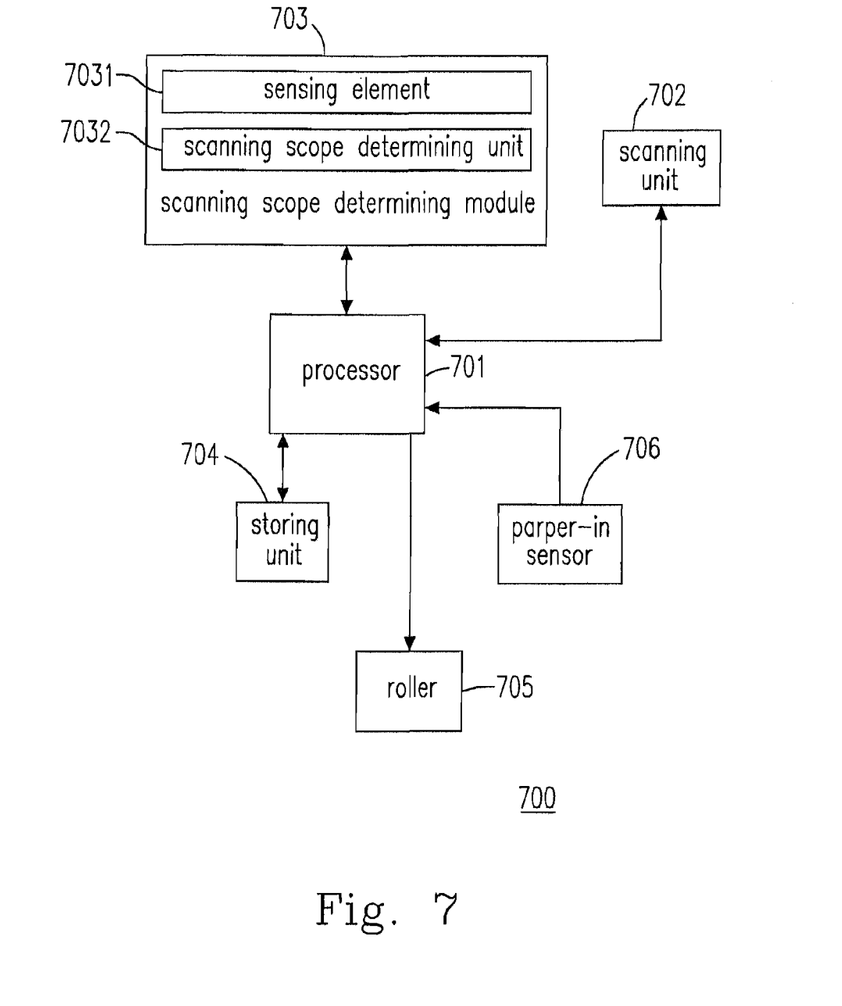
FIG. 7 is a diagram showing the third embodiment of the present invention.

Please refer to FIG. 7 which shows the third embodiment of the present invention. The third embodiment is a scanner 700. The scanner 700 includes a processor 701, a scanning unit 702, a scanning scope determining module 703, a storing unit 704, a roller 705 and a paper-in sensor 706. The scanning scope determining module 703 further includes a sensing element 7031 and a scanning scope determining unit 7032 for determining or defining a scanning scope of the scanner 700. The sensing element 7031 is used to sense the scanning scope determining unit 7032 so as to determine a cutting scope of the real-time image auto-cutting function. The scanning unit 702 is used to scan an object for obtaining an image file, and the processor 701 processes the image file with the real-time image auto-cutting function according to the information provided by the scanning scope determining module 703 so as to store the processed image file in the storing unit 704. It is noted that the sensing element 7031 could be a Charge-coupled Device (CCD), a Contact Image Sensor (CIS), a Photomultiplier Tube (PMT), a Complementary Metal-Oxide Semiconductor (CMOS), an infrared sensor or other conventional sensors. In other words, the scanner 700 can include a first scanning unit for scanning a picture and a second scanning unit for scanning or sensing the scanning scope determining unit 7032, and the first scanning unit is corresponding to the scanning unit 702 and the second scanning unit is corresponding to the sensing element 7031.

There are still other embodiments, which are described as follows.

Embodiment could be:

1. A scanner, comprising: a processor; a scanning scope determining module having a scanning scope determining unit, coupled to the processor and determining a scanning scope; a scanning unit coupled to the processor and scanning an object to obtain an image file; and a storing unit coupled to the processor and storing the image file.

2. A scanner as described in Embodiment 1, wherein the scanning scope determining module further comprises a sensing element sensing the scanning scope determining unit so as to implement a real-time image auto-cutting function.

3. A scanner as claimed in Embodiment 2, wherein the real-time image auto-cutting function processes the image file according to the scanning scope determined by the scanning scope determining unit when the scanning unit is scanning the object.

4. A scanner, comprising: a positioning element; a scanning scope determining unit configured on the positioning element, having a specific pattern and provided to determine a scanning scope; and a scanning unit ascertaining the specific pattern to determine the scanning scope.

5. A scanner as claimed in Embodiment 1 or 4 being one of a sheet-fed scanner and a handy scanner.

6. A scanner as claimed in Embodiment 1 or 4, wherein the scanning scope determining unit further comprises a protrusion to form the specific pattern.

7. A scanner as claimed in Embodiment 1 or 4, wherein the specific pattern comprises one being selected from a group consisting of an object, a text, a mark, a figure and a combination thereof.

8. A scanner as claimed in Embodiment 7, wherein the object has one of a 2-D and a 3-D shapes and the 3-D shape has a cross-section being one selected from a group consisting of a line, a circle, a triangle, a polygon, a random one and a combination thereof.

9. A scanner as claimed in Embodiment 1 or 4, wherein the specific pattern is a barcode.

10. A scanner as claimed in Embodiment 1 or 4, wherein the scanning unit is one selected from a group consisting of a Charge-Coupled Device (CCD), a Contact Image Sensor (CIS), a Photomultiplier Tube (PMT), a Complementary Metal-Oxide Semiconductor (CMOS) and an infrared sensor.

11. A scanner as claimed in Embodiment 1 or 4, wherein the scanning unit is further configured to scan an object and has a scanning region, and the scanning scope determining unit is further configured in the scanning region.

12. A scanner, comprising a scanning scope determining unit having a specific pattern and determining a scanning scope.

13. A scanner as claimed in Embodiment 12 further comprising a scanning unit scanning the specific pattern.

While the invention has been described in terms of what are presently considered to be the most practical and preferred embodiments, it is to be understood that the invention need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore the above description and illustration should not be taken as limiting the scope of the present invention which is defined by the appended claims.

What is claimed is:

1. A scanner, comprising:
   a processor;
   a scanning scope determining module having a scanning scope determining unit, coupled to the processor and determining a scanning scope;
   a scanning unit coupled to the processor and scanning an object to obtain an image file; and
   a storing unit coupled to the processor and storing the image file;
   wherein the scanning scope determining module further comprises a sensing element sensing the scanning scope determining unit so as to implement a real-time image auto-cutting function; and
   wherein the real-time image auto-cutting function processes the image file according to the scanning scope determined by the scanning scope determining unit when the scanning unit is scanning the object.

2. A scanner, comprising:
   a positioning element;
   a scanning scope determining unit configured on the positioning element, having a specific pattern and provided to determine a scanning scope; and
   a scanning unit ascertaining the specific pattern to determine the scanning scope;
   wherein the specific pattern comprises one being selected from a group consisting of an object, a text, a mark, a figure and a combination thereof; and
   wherein the object has one of a 2-D and a 3-D shapes and the 3-D shape has a cross-section being one selected from a group consisting of a line, a circle, a triangle, a polygon, a random one and a combination thereof.

3. A scanner as claimed in claim 2 being one of a sheet-fed scanner and a handy scanner.

4. A scanner as claimed in claim 2, wherein the scanning scope determining unit further comprises a protrusion to form the specific pattern.

5. A scanner as claimed in claim 2, wherein the specific pattern is a barcode.

6. A scanner as claimed in claim 2, wherein the scanning unit is one selected from a group consisting of a Charge-Coupled Device (CCD), a Contact Image Sensor (CIS), a Photomultiplier Tube (PMT), a Complementary Metal-Oxide Semiconductor (CMOS) and an infrared sensor.

7. A scanner as claimed in claim 2, wherein the scanning unit is further configured to scan an object and has a scanning region, and the scanning scope determining unit is further configured in the scanning region.

* * * * *